US012275861B2

(12) United States Patent
Larimer et al.

(10) Patent No.: US 12,275,861 B2
(45) Date of Patent: Apr. 15, 2025

(54) IMPACT RESISTANT COATING COMPOSITIONS, MULTI-LAYER COATING SYSTEMS, AND SUBSTRATES AT LEAST PARTIALLY COATED WITH SUCH COMPOSITIONS

(71) Applicant: PPG INDUSTRIS OHIO, INC., Cleveland, OH (US)

(72) Inventors: Troy James Larimer, North Huntingdon, PA (US); John Robert Schneider, Sharpsburg, PA (US); Amy Liane Toolis, Pittsburgh, PA (US); Anthony Michael Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/329,260

(22) Filed: Jun. 5, 2023

(65) Prior Publication Data
US 2023/0348730 A1    Nov. 2, 2023

Related U.S. Application Data

(62) Division of application No. 14/972,128, filed on Dec. 17, 2015, now Pat. No. 11,718,762.

(51) Int. Cl.
*C09D 5/03* (2006.01)
*C09D 5/08* (2006.01)
*C09D 7/40* (2018.01)
*C09D 163/00* (2006.01)

(52) U.S. Cl.
CPC ............ *C09D 5/033* (2013.01); *C09D 5/03* (2013.01); *C09D 5/038* (2013.01); *C09D 5/08* (2013.01); *C09D 7/69* (2018.01); *C09D 163/00* (2013.01)

(58) Field of Classification Search
CPC .......... C09D 5/033; C09D 5/03; C09D 5/038; C09D 5/08; C09D 7/69; C09D 163/00
See application file for complete search history.

(56) References Cited

U.S. PATENT DOCUMENTS

| 4,252,782 A | 2/1981 | Bailey |
| 4,381,334 A | 4/1983 | Balk et al. |
| 4,431,689 A | 2/1984 | Gunter |
| 4,501,853 A | 2/1985 | Sugimori et al. |
| 4,933,382 A | 6/1990 | Kitagawa et al. |
| 4,999,238 A | 3/1991 | Gawin |
| 5,143,950 A | 9/1992 | Kitagawa et al. |
| 5,153,239 A | 10/1992 | Kitagawa et al. |
| 5,317,068 A | 5/1994 | Watanabe |
| 5,507,928 A | 4/1996 | Bohmert |
| 5,627,222 A | 5/1997 | Recker et al. |
| 5,721,052 A | 2/1998 | Muthiah |
| 5,846,607 A | 12/1998 | Hurley et al. |
| 5,919,530 A | 7/1999 | Hurley et al. |
| 5,981,086 A | 11/1999 | Siminski |
| 6,346,292 B1 | 2/2002 | Grubb et al. |
| 6,521,706 B1 | 2/2003 | Desai et al. |
| 6,590,042 B1 | 7/2003 | Tang |
| 6,663,968 B2 | 12/2003 | Grubb et al. |
| 6,677,032 B1 | 1/2004 | Grubb et al. |
| 6,841,251 B2 | 1/2005 | Desai et al. |
| 6,861,475 B2 | 3/2005 | Ilenda et al. |
| 7,018,716 B2 | 3/2006 | Grubb et al. |
| 7,288,290 B2 | 10/2007 | Chao et al. |
| 7,649,044 B2 | 1/2010 | Czornij |
| 7,816,446 B2 | 10/2010 | Shahidi et al. |
| 8,013,036 B2 | 9/2011 | Shahidi et al. |
| 8,574,708 B2 * | 11/2013 | Cinoman ............ C08G 59/182 427/195 |
| 8,647,745 B2 | 2/2014 | Lucas |
| 10,240,064 B2 | 3/2019 | Kabagambe et al. |
| 11,718,762 B2 | 8/2023 | Larimer et al. |
| 2002/0074696 A1 | 6/2002 | Wu et al. |
| 2004/0101670 A1 | 5/2004 | Grubb et al. |
| 2009/0068473 A1 | 3/2009 | Van Wessel et al. |
| 2012/0258316 A1 | 10/2012 | Lucas |
| 2013/0273364 A1 | 10/2013 | Breidenstein et al. |
| 2013/0345339 A1 | 12/2013 | Al-Aqeeli et al. |
| 2014/0058030 A1 | 2/2014 | Johnston et al. |
| 2014/0316031 A1 | 10/2014 | Al-Aqeeli et al. |

(Continued)

FOREIGN PATENT DOCUMENTS

| CN | 101255311 A | 9/2008 |
| CN | 101974303 A | 2/2011 |

(Continued)

OTHER PUBLICATIONS

"Micronized Rubber Powder MicroDyne 50-Product Specification", LT Lehigh Technologies MicroDyne, 1 page.
"Micronized Rubber Powder MicroDyne 75—Product Specification", LT Lehigh Technologies MicroDyne, 1 page.
"Natural Rubber", Wikipedia, Dec. 2014, pp. 1-12, from https://web.archive.org/web/20141230070230/https://en.wikipedia.org/wiki/Natural_rubber.
Shreepathi et al., "Electrochemical impedance spectroscopy investigations of epoxy zinc rich coatings: Role of Zn content on corrosion protection mechanism", Electrochimica Acta, 2010, pp. 5129-5134, vol. 55.
Vilche et al., "Application of EIS and SEM to evaluate the influence of pigment shape and content in ZRP formulations on the corrosion prevention of naval steel", Corrosion Science, 2002, pp. 1287-1309, vol. 44.

(Continued)

Primary Examiner — Callie E Shosho
Assistant Examiner — Bethany M Miller
(74) Attorney, Agent, or Firm — Krisanne Shideler

(57) ABSTRACT

A curable coating composition includes: (a) a binder having a film-forming resin with at least two functional groups, and (ii) a curing agent reactive with the functional groups of the film-forming resin; and (b) solid vulcanized rubber particles that are unreactive with the binder. The curable coating composition is a solid particulate powder coating composition. Multi-layer coating systems, coated substrates, and methods of preparing the curable coating composition are also disclosed.

20 Claims, No Drawings

(56) References Cited

U.S. PATENT DOCUMENTS

2015/0240113 A1 8/2015 Pratt et al.
2016/0257845 A1 9/2016 Park et al.

FOREIGN PATENT DOCUMENTS

| CN | 103805027 | A | 5/2014 |
|---|---|---|---|
| CN | 104640937 | A | 5/2015 |
| EP | 0806459 | A2 | 11/1997 |
| EP | 0525418 | B1 | 11/2002 |
| GB | 2119390 | A | 11/1983 |
| JP | S57195772 | A | 12/1982 |
| JP | 1182370 | A | 7/1989 |
| JP | 726119 | A | 1/1995 |
| JP | 7103343 | B2 | 11/1995 |
| JP | 11256074 | A | 9/1999 |
| JP | 11256075 | A | 9/1999 |
| JP | 2000143938 | A | 5/2000 |
| JP | 2002131905 | A | 5/2002 |
| KR | 1020070022499 | A | 2/2007 |
| KR | 100754961 | B1 | 9/2007 |
| KR | 1020150051106 | | 5/2015 |
| WO | WO-9958274 | A1 | 11/1999 |
| WO | WO-03/076537 | A1 | 9/2003 |
| WO | WO-2007025389 | | 3/2007 |
| WO | WO-2014043048 | A2 | 3/2014 |

OTHER PUBLICATIONS

Zhang, "Zinc-Rich Coatings", Corrosion and Electrochemistry of Zinc, 1996, pp. 337-349.
Dijiang (ed.), "Composites Theory", 1998, pp. 98-100, 1st Edition, Wuhan University of Technology Press, China.
Yuzhong (ed.), "Plastics Modification (Revised)", 1988, pp. 144-147, 1st Edition, Scientific and Technological Literature Press, China.
"EPON Resin 1001F Technical Data Sheet", Hexion: Responsible Chemistry, Sep. 2007, from https://www.hexion.com/en-US/product/epon-resin-1001f>.
Shwarz et al., "Novel Materials for Shoe-making", 1st Edition, Light Industry Press, 1983, pp. 56-58.
Xiaomin et al., "Introduction to Polymer Materials", 1st Edition. Anhui University Press, 2006, pp. 139-140.
"Standard Classification for Rubber Compounding Materials-Recycled Vulcanizate Particulate Rubber", ASTM International, Oct. 2015, pp. 1-4.
Bilitewski et al., "Best Practice Municipal Waste Management", Umwelt Bundesamt, May 2018, pp. 1-6.
"Designation: D 297-93: Standard Test Methods for Rubber Products-Chemical Analysis", ASTM International, 2002, pp. 1-37.
"Designation: D5644-18: Standard Test Method for Rubber Compounding Materials-Determination of Particle Size Distribution of Recycled Vulcanizate Particulate Rubber", ASTM International, 2020, pp. 1-3.
"EPON Resin 2022: Technical Data Sheet", Hexion: Responsible Chemistry, Feb. 2002, pp. 1-2.
Manuel, "Standards for Rubber Granules and Powders", Recycling and Environment, 2001, pp. 101-105.
Pham et al., Ulmann's Encyclopedia of Industrial Chemistry, Epoxy Resins, 2005, pp. 1-94.
3M(TM) Scotchkote(TM) Fusion-Bonded Epoxy Coating 6233 product literature, Jul. 25, 2017, pp. 1-14.
Calcium Silicate definition downloaded from https://www.corrosionpedia.com/definition/4982/calcium-silicate on Feb. 16, 2018.
Advanced Materials High Performance Components product literature, 2010, from http://www.huntsman.com/advanced_materials.
The Matador Rubber—Rubber Chemistry article, 2007, from http://laroverket.com/wp-content/uploads/2015/03/rubber_chemistry.pdf.
EPIKOTE(TM) 1004 Product Data, Sep. 2002, from http://www.ecotutela.net/pdf/epikote%201004BISFENOLO.pdf.
Machine translation of JP 2000-143938 A (2000).
Polydimethylsiloxane properties document (2 pages), from https://polymerdatabase.com/polymers/Polydimethylsiloxane.html (2015).
Moore, "One-component moisture-cured urethanes as binders for sports and safety surfaces", Sep. 1993, pp. 32-34, European Adhesives & Sealants.
"EPON Resin 2004: Technical Data Sheet", Hexion: Responsible Chemistry, Jan. 2008, from https://www.hexion.com/en-US/product/epon-resin-2004>.

\* cited by examiner

IMPACT RESISTANT COATING COMPOSITIONS, MULTI-LAYER COATING SYSTEMS, AND SUBSTRATES AT LEAST PARTIALLY COATED WITH SUCH COMPOSITIONS

CROSS-REFERENCE TO RELATED APPLICATIONS

This application is a divisional of U.S. patent application Ser. No. 14/972,128, filed on Dec. 17, 2015, now U.S. Pat. No. 11,718,762 and titled "IMPACT RESISTANT COATING COMPOSITIONS", which is incorporated herein by reference in its entirety.

FIELD OF THE DISCLOSURE

The present disclosure relates to impact resistant coating compositions, multi-layer coating systems, methods of preparing the coating compositions, and substrates at least partially coated with such compositions.

BACKGROUND

Metallic substrates, such as cold-rolled steel found in springs and coils, are susceptible to chipping, scratching, and other physical damage. To prevent or reduce such damage, an impact resistant coating is typically applied over the surface of the substrate or over a corrosion resistant primer that is first applied to the substrate. However, by increasing the impact resistance of a coating, other desirable properties, such as chemical resistance and Taber resistance, are often adversely effected.

Considerable efforts have been expended in developing topcoats that reduce or prevent chipping, scratching, and other physical damage to metallic substrates. Although these coatings provide some degree of impact resistance and other desirable properties, they still exhibit some drawbacks. For example, some of the currently available impact resistant coatings exhibit an undesirable appearance, while other currently available coatings exhibit poor impact resistance and cushioning around curvatures of non-planar substrates such as metallic springs and coils.

In addition, some of the currently available impact resistant coatings exhibit poor impact resistance at low temperatures around −40° C. For instance, some of the currently available impact resistant coatings that include core-shell structures, thermoplastic resin blends, fibrous materials, and/or rubber adducts have been found to exhibit poor impact resistance at low temperatures around −40° C.

As such, it is desirable to provide improved impact resistant coatings that exhibit good impact resistance at low temperatures such as temperatures around −40° C.

SUMMARY OF THE DISCLOSURE

The present disclosure is directed to a curable coating composition comprising: (a) a binder comprising (i) a film-forming resin comprising at least two functional groups, and (ii) a curing agent reactive with the functional groups of (i); and (b) solid vulcanized rubber particles that are unreactive with the binder. Further, the curable coating composition is a solid particulate powder coating composition.

The present disclosure is also directed to a method of preparing a curable coating composition. The method includes mixing a combination of solid components to form a mixture comprising: a film-forming resin comprising at least two functional groups; a curing agent reactive with the functional groups of the film-forming resin; and solid vulcanized rubber particles unreactive with the film-forming resin and curing agent. The mixture is then melted and further mixed. The melted mixture is cooled and ground to form a solid particulate curable powder coating composition.

The present is further directed to a multi-layer coating system comprising: a first coating layer; and a second coating layer deposited over the first coating layer. The first and/or second coating layer is prepared from a curable coating composition comprising: (a) a binder comprising (i) a film-forming resin comprising at least two functional groups, and (ii) a curing agent reactive with the functional groups of (i); and (b) solid vulcanized rubber particles that are unreactive with the binder. Further, said curable coating composition that forms the first and/or second coating layer is a solid particulate powder coating composition.

DETAILED DESCRIPTION

For purposes of the following detailed description, it is to be understood that the compositions and coated substrates may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" film-forming resin, "a" curing agent, "a" vulcanized rubber particle, and the like refer to one or more of any of these items.

As indicated, the present disclosure is directed to a curable coating composition. As used herein, the terms "curable", "cure", and the like, as used in connection with a coating composition, means that at least a portion of the components that make up the coating composition are polymerizable and/or crosslinkable. The curable coating composition can be cured at ambient conditions, with heat, or with other means such as actinic radiation. As used herein, "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV) light, X-ray, and gamma radiation.

The curable coating composition disclosed herein includes a binder. As used herein, a "binder" refers to a main constituent material that holds all components together upon curing of the curable coating composition applied to a substrate. The binder includes one or more, such as two or more, film-forming resins. As used herein, a "film-forming resin" refers to a resin that can form a self-supporting continuous film on at least a horizontal surface of a substrate upon removal of any diluents or carriers present in the composition or upon curing. Further, as used herein, the term "resin" is used interchangeably with "polymer," and the term polymer refers to oligomers and homopolymers (e.g., prepared from a single monomer species), copolymers (e.g., prepared from at least two monomer species), terpolymers (e.g., prepared from at least three monomer species), and graft polymers.

The film-forming resins can include any of a variety of thermosetting film-forming resins known in the art. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents.

In some examples, the film-forming resins include thermoplastic resins. As used herein, the term "thermoplastic" refers to resins that include polymeric components that are not joined by covalent bonds and, thereby, can undergo liquid flow upon heating and are soluble in solvents.

Alternatively, the curable coating composition of the present disclosure is substantially free, essentially free, or completely free of a thermoplastic resin. The term "substantially free of a thermoplastic resin" means that the curable coating composition contains less than 1000 parts per million by weight (ppm) of a thermoplastic resin based on the total weight of the composition, "essentially free of a thermoplastic resin" means that the curable coating composition contains less than 100 ppm of a thermoplastic resin based on the total weight of the composition, and "completely free of a thermoplastic resin" means that the curable coating composition contains less than 20 parts per billion by weight (ppb) of a thermoplastic resin based on the total weight of the composition, including absence of a thermoplastic resin.

Non-limiting examples of suitable film-forming resins include (meth)acrylate resins, polyurethanes, polyesters, polyamides, polyethers, polysiloxanes, epoxy resins, vinyl resins, copolymers thereof, and combinations thereof. As used herein, "(meth)acrylate" and like terms refers both to the acrylate and the corresponding methacrylate. Further, the film-forming resins can have any of a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), and combinations thereof.

As indicated, the resin used to form the binder can include, but is not limited to, an epoxy resin. The epoxy resin can comprise at least two epoxide functional groups. The epoxide functional groups can be terminal and/or pendant on the polymer chain. As used herein, a "pendant group" refers to a functional group that is attached to and extends out from the backbone of a polymer. The epoxy resin can also include any of the additional functional groups previously described. For example, the epoxy resin can include at least one hydroxyl group. The hydroxyl groups, as well as any of the other additional functional groups, can be terminal and/or pendant on the polymer chain. Non-limiting examples of epoxy resins include, but are not limited to, diglycidyl ethers of bisphenol A, polyglycidyl ethers of polyhydric alcohols, polyglycidyl esters of polycarboxylic acids, and combinations thereof. Non-limiting examples of suitable epoxy resins are also commercially available from NanYa Plastics under the trade name NPES-903, and from Hexion under the trade names EPON™ 2002 and EPON2004™.

The epoxy resin can have an equivalent weight of at least 500 or at least 700. The epoxy resin can also comprise an equivalent weight of up to 1000 or up to 5100. The epoxy resin can comprise an equivalent weight range within the range of 500 to 5100 or from 700 to 1000. As used herein, "equivalent weight" refers to the average weight molecular weight of a resin divided by the number of functional groups. As such, the equivalent weight of the epoxy resin is determined by dividing the average weight molecular weight of the epoxy resin by the total number of epoxide groups and any other optional functional groups that are not an epoxide. Further, the average weight molecular weight is determined by gel permeation chromatography relative to linear polystyrene standards of 800 to 900,000 Daltons as measured with a Waters 2695 separation module with a Waters 410 differential refractometer (RI detector). Tetrahydrofuran (THF) is used as the eluent at a flow rate of 1 ml min-1, and two PLgel Mixed-C (300×7.5 mm) columns is used for separation.

The binder used to form the coating composition can also include two or more epoxy resins. For example, the binder can include at least two separate and distinct epoxy resins in which each epoxy resin independently comprises at least two epoxide functional groups and, optionally, any of the other functional groups previously described, such as one or more hydroxyl groups. The multiple epoxy resins can have the same or different equivalent weights. For instance, a first epoxy resin can have an equivalent weight that is greater than an equivalent weight of a second epoxy resin.

When two separate epoxy resins are used with the coating composition, the second epoxy resin can comprise an equivalent weight of at least 500 or at least 700. The second epoxy resin can also comprise an equivalent weight of up to 1000 or up to 5000. The second epoxy resin can comprise an equivalent weight range within the range of 500 to 5000 or from 700 to 1000.

Further, the first epoxy resin can comprise an equivalent weight of at least 800 or at least 900. The first epoxy resin can also comprise an equivalent weight of up to 5100 or up to 1100. The first epoxy resin can comprise an equivalent weight range within the range of 800 to 5100 or from 900 to 1100.

The film-forming resins used to form the binder can comprise a glass transition temperature (Tg) of at least 35° C. or at least 40° C. The Tg is determined using differential scanning calorimetry (DSC).

The coating composition can also comprise at least 15 weight %, at least 30 weight %, at least 50 weight %, at least 60 weight % or at least 75 weight % of one or more film-forming resins, based on the total solids weight of the coating composition. The coating composition can comprise up to 90 weight % or up to 93 weight % of one or more film-forming resins, based on the total solids weight of the coating composition. The coating composition can further include a range such as from 15 weight % to 93 weight %, or from 50 weight % to 93 weight %, or from 60 weight % to 90 weight % of one or more film-forming resins, based on the total solids weight of the coating composition.

As previously indicated, any of the ranges recited herein include any of the sub-ranges contained within such ranges.

The binder can also include a curing agent that is reactive with the functional groups of the film-forming resins. As used herein, a "curing agent" refers to a chemical compound that is capable of reacting with a chemical group on a resin to cure or crosslink the resin material. Non-limiting examples of curing agents include phenolic compounds such as phenolic hydroxyl functional compounds, epoxy compounds, triglycidyl isocyanurate, beta-hydroxy (alkyl) amides, alkylated carbamates, isocyanates, polyacids, anhydrides, organometallic acid-functional materials, polyamines, polyamides, polyfunctional polyols, aminoplasts, uretdiones such as polyuretdiones, boron trifluoride complexes, and combinations thereof. The curing agent is not so limited and can include any curing agent that is reactive with one or more functional groups on the film-forming resins.

In some examples, the binder used in the coating composition can include an epoxy resin having at least two epoxide functional groups and a curing agent that is reactive with the epoxide groups of the epoxy resin. The curing agent that is reactive with the epoxy resin can include one or more, such as two or more, of the previously described curing agents that are reactive with epoxide groups. For example, the curing agent can comprise a phenolic hydroxyl functional compound. A non-limiting example of a suitable phenolic hydroxyl functional curing agent is commercially available from Hexion under the trade name EPIKURE™ P-201 and P-202. Other examples of suitable curing agents that are reactive with the epoxide groups of the epoxy resins are also disclosed in column 7, lines 16 to 35 of U.S. Pat. No. 6,521,706, which is incorporated by reference herein.

As indicated, the binder can include multiple curing agents that are reactive with the same or different functional groups on the film-forming resins. For example, the binder can include: (1) an epoxy resin that comprises at least two epoxide groups and at least one hydroxyl functional group; and (2) at least two curing agents in which a first curing agent is reactive with the epoxide functional groups and a second curing agent that is reactive with the hydroxyl group. In some examples, the second curing agent can be chosen to react with the at least one hydroxyl group on the resin to form a urethane linkage. Such curing agents include, but are not limited to, isocyanates, uretdiones, and mixtures thereof. The second curing agent can also be chosen to react with the functional groups formed from a reaction between the first curing agent and the epoxide functional groups.

The coating composition of the present disclosure can comprise at least 3 weight %, at least 10 weight %, or at least 15 weight % of one or more curing agents, based on the total solids weight of the coating composition. The coating composition can comprise up to 35 weight % or up to 30 weight % of one or more curing agents, based on the total solids weight of the coating composition. The coating composition can further include a range such as from 3 weight % to 35 weight %, or from 5 weight % to 32 weight %, or from 10 weight % to 30 weight %, or from 15 weight % to 30 weight % of one or more curing agents, based on the total solids weight of the coating composition.

Further, the binder that is used to form the curable coating composition can be a solid. As such, the film-forming resins and curing agents reactive with the film-forming resins that make up the binder can be in solid form. It is appreciated that any of the components that form the binder can be provided initially as a liquid and/or a dispersion and then processed into a solid using techniques known in the art.

The binder can be present in the coating composition in an amount of at least 15 weight %, at least 30 weight %, at least 50 weight %, at least 60 weight %, or at least 75 weight %, based on the total solids weight of the coating composition. The binder can be present in the coating composition in an amount up to 90 weight %, or up to 93 weight %, or up to 96 weight %, based on the total solids weight of the coating composition. The binder can further be present in a range such as from 15 weight % to 96 weight %, or from 50 weight % to 96 weight %, or from 60 weight % to 96 weight %, or from 75 weight % to 90 weight %, based on the total solids weight of the coating composition.

The curable coating composition of the present disclosure also includes vulcanized rubber particles that are unreactive with the binder. As used herein, a "vulcanized rubber particle" refers to a particle made of an elastomeric material that includes bonds that crosslink the polymer chains that make up the elastomeric material. For example, the vulcanized rubber particles can be crosslinked through sulfur bonds, through free radical crosslinking such as with peroxides, with metal oxides, with allylic chlorine containing compounds, with phenol-formaldehyde resins, with p-benzoquinonedioxime, or combinations thereof. The vulcanized rubber particle can also be prepared from a variety of elastomeric materials. Non-limiting examples of suitable rubbers include nitrile rubber, butyl rubber, silicone rubber, ethylene propylene rubber, ethylene propylene diene terpolymer rubber, styrene butadiene rubber, natural rubber, polybutadiene, or combinations thereof.

The vulcanized rubber particles can be obtained from recycled rubber materials. For example, the vulcanized rubber particles used with the curable coating composition can be obtained from recycled tires. As a result, the vulcanized rubber particles can include additional components such as carbon black and others fillers typically found in the rubber material of tires.

The vulcanized rubber particles can comprise various shapes and sizes. For instance, the vulcanized rubber particles can comprise an average particle size of at least 10 microns, at least 15 microns, or at least 25 microns. The vulcanized rubber particles can comprise an average particle size of up to 85 microns, up to 80 microns, or up to 75 microns. The vulcanized rubber particles can comprise an average particle size range of 10 microns to 85 microns, 15 microns to 80 microns, or 25 microns to 75 microns. As used herein, "average particle size" refers to the mean (average) particle size of the total amount of particles in a sample as determined by a Beckman-Coulter LS™ 13 320 Laser Diffraction Particle Size Analyzer following the instructions described in the Beckman-Coulter LS™ 13 320 manual. Further, the particle size range of the total amount of particles in a sample used to determine the average particle size can comprise a range of from 5 microns to 175 microns, or from 5 microns to 110 microns, or from 5 microns to 90 microns, which is also determined with a Beckman-Coulter LS™ 13 320 Laser Diffraction Particle Size Analyzer following the instructions described in the Beckman-Coulter LS™ 13 320 manual.

The particle sizes previously described can be obtained by grinding vulcanized rubber materials such as by grinding recycled rubber materials. The ground vulcanized rubber with the desired particle size can be prepared by any method known to those skilled in the art for achieving such small particle sizes. In some examples, the vulcanized rubber particles are prepared at the desired particle size using cryogenic grinding techniques. Non-limiting examples of methods for preparing vulcanized rubber with the desired particle size are also described in column 6, lines 9 to 33 of U.S. Pat. No. 6,521,706, which is incorporated by reference herein.

The vulcanized rubber particles can have a glass transition temperature (Tg) of less than −40° C. The vulcanized rubber particles can also have a Tg of less than −45° C., or less than −50° C. The Tg is determined using DSC as previously described. The vulcanized rubber particles can comprise a combination of particles with different Tg's. For instance, the curable coating composition can include vulcanized rubber particles that independently comprise any of the Tg's previously described.

Further, the vulcanized rubber particles can comprise functional groups with the proviso that they do not react with the components that form the binder. Therefore, the vulcanized rubber particles are unreactive with the film-forming resins and curing agents that form the binder. The functional vulcanized rubber particles can comprise, but are not limited to, any of the functional groups previously described as regards to the film-forming resin with the proviso that the functional groups are unreactive with the functional groups found on the film-forming resins and curing agents of the binder. The vulcanized rubber particles are also unreactive with any of the other components used with the curable coating composition. Because the vulcanized rubber particles are unreactive with the other components of the curable coating composition, the vulcanized rubber particles will not react with these components to form an adduct, a core-shell structure, or any other covalently bonded arrangement. In some examples, the coating composition is free of elastomeric materials, such as the rubber particles, that form bonds with the resins and curing agents.

The vulcanized rubber particles that are used with the curable coating composition can also be a solid. As such, the vulcanized rubber particles can be formed from a solid elastomeric material including, but not limited to, a solid recycled vulcanized rubber material. In some examples, the solid vulcanized rubber particles are a solid particulate powder. For example, the vulcanized rubber particles can comprise a powder produced from recycled rubber material as defined by ASTM D5603-01(2015), which is incorporated by reference herein in its entirety.

The coating composition can comprise at least 1 weight %, at least 5 weight %, or at least 10 weight % of vulcanized rubber particles, based on the total solids weight of the coating composition. The coating composition can also comprise up to 40 weight %, up to 25 weight %, or up to 20 weight % of vulcanized rubber particles, based on the total solids weight of the coating composition. The coating composition can further comprise a range such as from 1 weight % to 40 weight %, or from 5 weight % to 25 weight %, or from 10 weight % to 20 weight % of vulcanized rubber particles, based on the total solids weight of the coating composition.

It was found that the addition of unreactive vulcanized rubber particles improves the impact resistance of coatings formed from the curable coating compositions of the present disclosure. The coatings also exhibit other desirable properties, such as good flexibility, appearance, Taber resistance, chip resistance, and chemical resistance.

The curable coating composition can also include pigment particles. As used herein, a "pigment particle" refers to a particle that are used to impart color in a coating composition. The term "colorant" is used interchangeably with the term "pigment particle." Non-limiting examples of pigment particles can include those used in the paint industry and/or listed in the Dry Color Manufacturers Association (DCMA). Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), carbon black, certain metal oxides, and mixtures thereof.

The coating composition of the present disclosure can include from 0.25 weight % to 50 weight %, or from 0.5 weight % to 50 weight %, or from 1 weight % to 40 weight %, or from 5 weight % to 30 weight % of one or more pigment particles, based on the total solids weight of the coating composition.

Other non-limiting examples of materials that can be used with the coating compositions include plasticizers, fillers including, but not limited to, talcs, micas, wollastonite, graphite, calcium carbonate, micaceous iron oxide, barium sulfate, clays, anti-oxidants, flow and surface control agents, thixotropic agents, slip aids, catalysts, reaction inhibitors, texturizers, and other customary auxiliaries.

Particularly useful fillers that can be used with the curable coating compositions include platy inorganic fillers, needle-shaped inorganic fillers, or combinations thereof. As used herein, a "platy inorganic filler" refers to an inorganic material in the platy form. The term "platy" refers to a structure in which one dimension is substantially smaller than the two other dimensions of the structure resulting in a flat type appearance. The platy inorganic fillers are generally in the form of stacked lamellae, sheets, platelets, or plates with a relatively pronounced anisometry. The term "needle-shaped inorganic filler" refers to a structure in which one dimension is substantially larger than the other two dimensions of the structure resulting in a needle type appearance. The platy inorganic filler and needle-shaped inorganic filler can further improve the impact performance of the resulting coating.

The platy and needle-like inorganic fillers can have a high aspect ratio. Suitable high aspect ratio platy and needle-like inorganic fillers include, but are not limited to, vermiculite, mica, talc, wollastonite, chlorite, metal flakes, platy clays, and platy silicas. Such fillers typically have, but are not limited to, diameters of 1 to 100 microns, 2 to 25 microns, or 2 to 50 microns. The aspect ratio of such fillers can be at least 5:1, such as at least 10:1 or 20:1. For example, mica flakes may have an aspect ratio of 20:1, talc may have an aspect ratio of 10:1 to 20:1, and vermiculite may have an aspect ratio of from 200:1 to 10,000:1.

In some examples, the curable coating composition of the present disclosure is substantially free, essentially free, or completely free of fiberglass. As used herein, the term "fiberglass" refers to continuous strands of glass fibers that have been extruded into fine filaments. Further, the term "substantially free of fiberglass" means that the curable coating composition contains less than 1000 parts per million by weight (ppm) of fiberglass based on the total weight of the composition, "essentially free of fiberglass" means that the curable coating composition contains less than 100 ppm of fiberglass based on the total weight of the composition, and "completely free of fiberglass" means that the curable coating composition contains less than 20 parts per billion by weight (ppb) of fiberglass based on the total weight of the composition. In some examples, the absence of fiberglass in the curable coating compositions helps provide a cured coating with a better visual appearance and/or impact resistance.

The previously described binder, vulcanized rubber particles, and optional additional components can be combined to form a powder coating composition. A "powder coating composition" refers to a coating composition embodied in solid particulate form as opposed to liquid form. Thus, the previously described components can be combined to form a curable solid particulate powder coating composition. For instance, the binder, vulcanized rubber particles, and optional additional components can be combined to form a curable solid particulate powder coating composition that is free flowing. As used herein, the term "free flowing" with regard to curable solid particulate powder coating compositions of the present disclosure, refers a curable solid particulate powder composition having a minimum of clumping or aggregation between individual particles.

The curable solid particulate powder coating composition can be prepared by mixing the binder, vulcanized rubber particles unreactive with the binder, and optional additional components in solid form. It will be appreciated that some optional additives can be provided as a liquid or dispersion and formed into a solid material. The solid components are mixed such that a homogenous mixture is formed. The solid components can be mixed using art-recognized techniques and equipment such as with a Prism high speed mixer for example. The homogenous mixture is then melted and further mixed. The mixture can be melted with a twin screw extruder or a similar apparatus known in the art. During the melting process, the temperatures will be chosen to melt mix the solid homogenous mixture without curing the mixture. In some examples, the homogenous mixture can be melt mixed in a twin screw extruder with the first zone set to a temperature of 40° C. to 60° C., such as from 45° C. to 55° C., and with the second, third, and fourth zones set to a temperature of 70° C. to 110° C., such as from 75° C. to 100° C. After melt mixing, the mixture is cooled and re-solidified. The re-solidified mixture is then ground such as in a milling process to form a solid particulate curable powder coating composition. The re-solidified mixture can be ground to any desired particle size. For example, in an electrostatic coating application, the re-solidified mixture can be ground to an average particle size of at least 10 microns or at least 20 microns and up to 100 microns as determined with a Beckman-Coulter LS™ 13 320 Laser Diffraction Particle Size Analyzer following the instructions described in the Beckman-Coulter LS™ 13 320 manual. Further, the particle size range of the total amount of particles in a sample used to determine the average particle size can comprise a range of from 1 micron to 200 microns, or from 5 microns to 180 microns, or from 10 microns to 150 microns, which is also determined with a Beckman-Coulter LS™ 13 320 Laser Diffraction Particle Size Analyzer following the instructions described in the Beckman-Coulter LS™ 13 320 manual.

The curable coating composition of the present disclosure can be applied to a wide range of substrates known in the coatings industry. For example, the coating compositions can be applied to automotive substrates, industrial substrates, aerocraft and aerocraft components, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide (nylon), cellulosic, polystyrene, polyacrylic, poly(ethylene naphthalate), polypropylene, polyethylene, EVOH, polylactic acid, other "green" polymeric substrates, poly(ethyleneterephthalate) (PET), polycarbonate, polycarbonate/acrylonitrile-butadiene styrene copolymer blend (PC/ABS), wood, veneer, wood composite, particle board, medium density fiberboard, cement, stone, glass, paper, cardboard, textiles, leather, both synthetic and natural, and the like.

The curable coating compositions are particularly beneficial when applied directly to a metallic substrate or a pretreated metallic substrate. For example, the curable coating compositions are particularly beneficial when applied to metallic springs or coils such as cold-rolled steel coils, galvanized steel coils, and aluminum coils.

The curable coating compositions can be applied by any means standard in the art, such as spraying, electrostatic spraying, and the like. The coatings formed from the coating compositions of the present disclosure can be applied to a dry film thickness of 2 to 1800 microns, 50 to 1000 microns, or 300 to 800 microns.

The coating composition can be applied to a substrate to form a monocoat. As used herein, a "monocoat" refers to a single layer coating system that is free of additional coating layers. Thus, the coating composition can be applied directly to a substrate and cured to form a single layer coating, i.e. a monocoat. When the curable coating composition is applied to a substrate to form a monocoat, the coating composition can include additional components to provide other desirable properties. For example, the curable coating composition can also include an inorganic component that acts as a corrosion inhibitor. As used herein, a "corrosion inhibitor" refers to a component such as a material, substance, compound, or complex that reduces the rate or severity of corrosion of a surface on a metal or metal alloy substrate. The inorganic component that acts as a corrosion inhibitor can include, but is not limited to, an alkali metal component, an alkaline earth metal component, a transition metal component, or combinations thereof.

The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), Chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

Alternatively, the curable coating composition can be applied over a first coating layer deposited over a substrate to form a multi-layer coating system. For example, a coating composition can be applied to a substrate as a primer layer and the curable coating composition previously described can be applied over the primer layer as a topcoat. As used herein, a "primer" refers to a coating composition from which an undercoating may be deposited onto a substrate in order to prepare the surface for application of a protective or decorative coating system. A basecoat can also be used with the multi-layer coating system. A "basecoat" refers to a coating composition from which a coating is deposited onto a primer and/or directly onto a substrate, optionally including components (such as pigments) that impact the color and/or provide other visual impact, and which may be overcoated with a protective and decorative topcoat.

In some examples, a first coating layer, such as a primer layer, can be applied directly over a substrate to protect the substrate from corrosion and the curable coating composition previously described can be applied over the first coating layer to at least provide impact resistance. As such, the first coating layer can comprise a film-forming resin including, but not limited to, any of the film-forming resins previously described, optionally, a curing agent including, but not limited to, any of the curing agents previously described, an inorganic component that acts as a corrosion inhibitor, and, optionally, other additives previously described. The inorganic component that acts as a corrosion inhibitor and which can be used with the first coating layer can include, but is not limited to, any of the inorganic corrosion inhibiting components previously described.

It is appreciated that the curable coating composition comprising the solid vulcanized rubber particles can be used as the first coating layer in a multi-layer coating system. When used as a first layer, the curable coating composition can include additional components such as the inorganic corrosion inhibiting components previously described. The second coating layer applied over the first coating layer can include a coating prepared from the curable coating composition comprising the vulcanized rubber particles. The second coating layer can also be prepared from a different coating composition such as those known in the art.

It was found that the curable coating compositions of the present disclosure provide good impact resistance, flexibility, and visual appearance when applied to a metallic substrate and cured to form a coating. The curable coating compositions were also found to provide good impact resistance, flexibility, and visual appearance when used in a multi-layer coating system as a topcoat.

The following examples are presented to demonstrate the general principles of the disclosure. The disclosure should not be considered as limited to the specific examples presented. All parts and percentages in the examples are by weight unless otherwise indicated. Further, with respect to the Tables listed in the following Examples, the abbreviation "Comp. Ex." means "Comparative Example" and the abbreviation "Ex." means "Example."

EXAMPLES 1-7

Preparation of Curable Coating Compositions

Seven (7) curable coating compositions were prepared from the components listed in Table 1.

TABLE 1

| Component | Comp. Ex. 1 (gram) | Comp. Ex. 2 (gram) | Comp. Ex. 3 (gram) | Comp. Ex. 4 (gram) | Comp. Ex. 5 (gram) | Ex. 6 (gram) | Ex. 7 (gram) |
|---|---|---|---|---|---|---|---|
| NPES-903 [1] | 76.15 | — | 39.03 | 31.27 | 48.95 | 64.51 | 60.62 |
| EPON ™ 2004 [2] | — | 80.07 | 39.03 | — | — | — | — |
| HyPox ™ RK84L [3] | — | — | — | 50.09 | — | — | — |
| RESIFLOW ® PL-200A [4] | 1.00 | 1.00 | 1.00 | 1.00 | 1.00 | 1.00 | 1.00 |
| Uraflow B [5] | 0.50 | 0.50 | 0.50 | 0.50 | 0.50 | 0.50 | 0.50 |
| DYHARD ® MI-FF [6] | 0.22 | 0.23 | 0.22 | 0.23 | 0.14 | 0.17 | 0.17 |
| REGAL ® 660 [7] | 0.50 | 0.50 | 0.50 | 0.50 | 0.50 | 0.50 | 0.50 |
| EPIKURE TM P-202 [8] | 21.63 | 17.70 | 19.72 | 16.41 | 13.91 | 18.32 | 17.22 |
| Micronized/vulcanized rubber particles [9] | — | — | — | — | 15.00 | 15.00 | 15.00 |
| CRELAN ® EF 403 [10] | — | — | — | — | — | — | 5.00 |
| Milled fiber glass (less than 2 mm particle size) | — | — | — | — | 20.00 | — | — |

[1] An epoxy resin based on diglycidyl ether of bisphenol A having an equivalent weight of about 700 to 750, commercially available from NanYa Plastics.
[2] An epoxy resin based on diglycidyl ether of bisphenol A (formed from bisphenol A and epichlorohydrin) having an equivalent weight of about 875 to 975, commercially available from Hexion.
[3] An adduct of solid diglycidyl ether of Bisphenol A and a liquid rubber, commercially available from Emerald Performance Materials.
[4] Acrylic/silica flow and leveling control agent, commercially available from Estron Chemical.
[5] Benzoin, commercially available from Mitsubishi Chemical Corp.
[6] An accelerator for elevated temperature curing of epoxy resin formulations, commercially available from ALZ Chem.
[7] Carbon black, commercially available from Cabot.
[8] Phenolic hydroxyl terminated solid flaked curing agent containing an accelerator, commercially available from Hexion.
[9] Free flowing black powder produced from recycled vulcanized rubber material as defined by ASTM D5603-01(2015) with an average particle size range of 10 microns to 85 microns, as determined with a Beckman-Coulter LS ™ 13 320 Laser Diffraction Particle Size Analyzer following the instructions described in the Beckman-Coulter LS ™ 13 320 manual.
[10] Cycloalipatic polyuretdione without blocking agent, commercially available from Bayer.

Each of the components listed in Table 1 for Examples 1-7 were weighed in a container and mixed in a prism high speed mixer for 30 seconds at 3500 RPM to form a dry homogeneous mixture. The mixture was then melt mixed in a Werner Pfleiderer 19 mm twin screw extruder with an aggressive screw configuration and a speed of 500 RPM. The first zone was set at 50° C., and the second, third, and fourth zones were set at 80° C. The feed rate was such that a torque of 50-60% was observed on the equipment. The mixtures were dropped onto a set of chill rolls to cool and re-solidify the mixtures into solid chips. The chips were milled in a Mikro ACM®-1 Air Classifying Mill to obtain an average particle size of 10 microns to 100 microns. The resulting coating compositions for each of Examples 1-7 were solid particulate powder coating compositions that were free flowing.

Example 8

Application of Solid Particulate Powder Coatings

A first powder coating composition comprising an epoxy resin, a curing agent reactive with the epoxy resin, and a zinc component was applied over several high tensile strength steel coil springs. The first powder coating composition was applied at a thickness of 25 microns to 100 microns onto a pre-heated substrate at 375° F. for about 25 to 35 minutes to form a first coating layer. Each of the solid particulate powder coating compositions of Examples 1-7 were then electrostatically sprayed over the first coating layer while the first coating layer was still hot. The solid particulate powder coating compositions of Examples 1-7 were applied at a thickness of 350 microns to 1000 microns and baked for about 35 minutes at 375° F.

Example 9

Evaluation of Impact Resistance

Each of the multi-layer coatings prepared from the compositions of Examples 1-7 were evaluated for impact resistance and final dry film thickness of the primer plus topcoat. Film build was measured with a dry film gauge from Elcometer, model number 415. The impact resistance of each coating system was determined according to ISO 4532 at −40° C. The "pistol" testing instrument was set to a load of 90N. The coil springs were left in the freezer at −40° C. for 24 hours and then removed and impacted at a 900 angle to the coil springs surfaces within 30 seconds of being removed from the freezer.

Each of the coatings were tested various times for impact resistance using the test previously described. The coatings that exhibited physical damage, such as chipping, were recorded as a failure. The percent (%) failure was then determined based on the total number of tests administered for each type of coating. The results are shown in Table 2.

As shown in Table 2, the coatings prepared from the coating compositions of Examples 6 and 7, which included a topcoat according to the present disclosure, exhibited the best impact resistance with the lowest failure rates. Further, the coatings prepared from the coating compositions of Comparative Example 4, which included an adduct of solid diglycidyl ether of Bisphenol A and a liquid rubber, and Comparative Example 5, which included milled fiberglass, both exhibited 100% failure.

The present disclosure also includes the following aspects.

Aspect 1: A curable coating composition comprising: (a) a binder comprising: (i) a film-forming resin comprising at least two functional groups; and (ii) a curing agent reactive with the functional groups of (i); and (b) solid vulcanized rubber particles unreactive with the binder, wherein the curable coating composition is a solid particulate powder coating composition.

Aspect 2: The curable coating composition of aspect 1, wherein the film-forming resin has a glass transition temperature (Tg) of at least 35° C. such as at least 40° C.

Aspect 3: The curable coating composition of any one of aspects 1 or 2, wherein the film-forming resin comprises an epoxy resin having at least two epoxide groups and wherein the curing agent is reactive with the epoxide groups.

Aspect 4: The curable coating composition of aspect 3, wherein the epoxy resin further comprises at least one hydroxyl group.

Aspect 5: The curable coating composition of aspect 4, further comprising a second curing agent that is reactive with the hydroxyl group.

Aspect 6: The curable coating composition of any one of aspects 3 to 5, wherein the epoxy resin has an equivalent weight of from 500 to 5100.

Aspect 7: The curable coating composition of any one of aspects 1 or 2, wherein the curable coating composition comprises at least a first epoxy resin and a second epoxy resin that each independently comprise at least two epoxide groups and wherein the curing agent is reactive with the epoxide groups, wherein the first epoxy resin has an equivalent weight that is greater than the equivalent weight of the second epoxy resin.

Aspect 8: The curable coating composition of any one of aspects 7 or 5, wherein the first and/or second epoxy resin further comprise at least one hydroxyl group.

Aspect 9: The curable coating composition of any one of aspects 7 or 8, wherein the first epoxy resin has an equivalent weight of from 800 to 5100 such as from 900 to 1100 and the second epoxy resin has an equivalent weight of from 500 to 5000 such as from 700 to 1000.

Aspect 10: The curable coating composition of any one of aspects 1 to 9, wherein the solid vulcanized rubber particles have an average particle size of up to 85 microns such as

TABLE 2

| Testing Property | Comp. Ex. 1 | Comp. Ex. 2 | Comp. Ex. 3 | Comp. Ex. 4 | Comp. Ex. 5 | Ex. 6 | Ex. 7 |
| --- | --- | --- | --- | --- | --- | --- | --- |
| Average dry film thickness based on 6 readings (μm) | 638 | 816 | 663 | 893 | 740 | 689 | 892 |
| Powder Stability at −40° C. after 2 Days | Fine powder | Fine powder | Fine powder | Gelled | Fine powder | Fine powder | Fine powder |
| % Failure | 40% | 57% | 58% | 100% | 100% | 11% | 3% | from 10 microns to 85 microns, or form 15 microns to 80 microns, or from 25 microns to 75 microns.

Aspect 11: The curable coating composition of any one of aspects 1 to 10, wherein the solid vulcanized rubber particles comprise up to 40 weight % of the coating composition such as from 1 to 40 weight %, preferably from 5 to 25 weight %, and more preferably from 10 to 20 weight %, based on the total solid weight of the coating composition.

Aspect 12: The curable coating composition of any one of aspects 1 to 11, wherein the vulcanized rubber particles have a glass transition temperature (Tg) of less than −40° C. such as less than −45° C., or less than −50° C.

Aspect 13: The curable coating composition of any one of aspects 1 to 12, further comprising pigment particles.

Aspect 14: The curable coating composition of any one of aspects 1 to 13, wherein the coating composition contains less than 1000 parts per million by weight (ppm) of fiberglass, preferably less than 100 ppm of fiberglass, based on the total weight of the composition, and more preferably is completely free of fiberglass.

Aspect 15: The curable coating composition of any one of aspects 1 to 14, further comprising a platy inorganic filler, a needle-shaped inorganic filler, or a combination thereof.

Aspect 16: The curable coating composition of any one of aspects 1 to 15, wherein the coating composition contains less than 1000 parts per million by weight (ppm) of a thermoplastic resin, preferably less than 100 ppm of a thermoplastic resin, based on the total weight of the composition, and more preferably is completely free of a thermoplastic resin.

Aspect 17: The curable coating composition of any one aspects 1 to 16, wherein the coating composition further comprises an inorganic corrosion inhibiting component comprising a transition metal component, an alkali metal component, an alkaline earth metal component, or combinations thereof.

Aspect 18: The curable coating composition of any one aspects 1 to 17, wherein the coating composition comprises from 15 weight % to 93 weight %, or from 30 weight % to 90 weight %, or from 40 weight % to 85 weight %, or from 50 weight % to 85 weight %, or from 60 weight % to 80 weight % of one or more film-forming resins, based on the total solids weight of the coating composition.

Aspect 19: The curable coating composition of any one aspects 1 to 18, wherein the coating composition comprises from 3 weight % to 35 weight %, or from 5 weight % to 32 weight %, or from 10 weight % to 30 weight %, or from 15 weight % to 25 weight % of one or more curing agents, based on the total solids weight of the coating composition.

Aspect 20: The curable coating composition of any one aspects 1 to 19 consisting of particles having an average particle size of from 20 microns to 100 microns.

Aspect 21: A method of preparing a curable coating composition according to any one of aspects 1 to 20, the method comprising: (a) mixing a combination of solid components to form a mixture comprising: i) a film-forming resin comprising at least two functional groups; ii) a curing agent reactive with the functional groups of i); and iii) vulcanized rubber particles unreactive with (i) the film-forming resin and (ii) the curing agent; (b) melting and further mixing the mixture formed in (a); (c) cooling the melted mixture; and (d) grinding the mixture of solid components to form a solid particulate curable powder coating composition.

Aspect 22: A multi-layer coating system comprising: (a) a first coating layer; and (b) a second coating layer deposited over the first coating layer, wherein the first coating layer and/or the second coating layer is prepared from the curable coating composition according to any one of aspects 1 to 20.

Aspect 23: The multi-layer coating system of aspect 22, wherein the first coating layer comprises an inorganic corrosion inhibiting component comprising a transition metal component, an alkali metal component, an alkaline earth metal component, or combinations thereof.

Whereas particular embodiments of this disclosure have been described above for purposes of illustration, it will be evident to those skilled in the art that numerous variations of the details of the present disclosure may be made without departing from the disclosure as defined in the appended claims.

What is claimed is:

1. A multi-layer coating system comprising:
   (1) a first coating layer applied to a substrate and having a dry film thickness of 300 to 800 microns; and
   (2) a second coating layer deposited over the first coating layer,
   wherein the first coating layer is prepared from a curable coating composition comprising:
   (a) a binder comprising:
      (i) a film-forming resin comprising at least two functional groups; and
      (ii) a curing agent reactive with the functional groups of (i); and
   (b) solid vulcanized rubber particles unreactive with the binder, wherein the solid vulcanized rubber particles have an average particle size of at least 10 microns, and wherein the curable coating composition is a solid particulate powder coating composition.

2. The multi-layer coating system of claim 1, wherein the curable coating composition further comprises an inorganic corrosion inhibiting component comprising a transition metal component, an alkali metal component, an alkaline earth metal component, or combinations thereof.

3. The multi-layer coating system of claim 1, wherein the film-forming resin has a glass transition temperature (Tg) of at least 35° C.

4. The multi-layer coating system of claim 1, wherein the film-forming resin comprises an epoxy resin having at least two epoxide groups and wherein the curing agent is reactive with the epoxide groups.

5. The multi-layer coating system of claim 4, wherein the epoxy resin further comprises at least one hydroxyl group.

6. The multi-layer coating system of claim 5, wherein the curable coating composition further comprises a second curing agent that is reactive with the hydroxyl group.

7. The multi-layer coating system of claim 1, wherein the film-forming resin comprises at least a first epoxy resin and a second epoxy resin that each independently comprise at least two epoxide groups and wherein the curing agent is reactive with the epoxide groups of the first epoxy resin and the second epoxy resin, wherein the first epoxy resin has an equivalent weight that is greater than an equivalent weight of the second epoxy resin.

8. The multi-layer coating system of claim 7, wherein the first and/or second epoxy resin further comprise at least one hydroxyl group.

9. The multi-layer coating system of claim 1, wherein the solid vulcanized rubber particles have an average particle size of up to 85 microns.

10. The multi-layer coating system of claim 1, wherein the solid vulcanized rubber particles are present in the curable coating composition in an amount up to 40 weight %, based on the total solid weight of the curable coating composition.

11. The multi-layer coating system of claim 1, wherein the vulcanized rubber particles have a glass transition temperature (Tg) of less than −40° C.

12. The multi-layer coating system of claim 1, wherein the curable coating composition further comprises pigment particles, a platy inorganic filler, a needle-shaped inorganic filler, or a combination thereof.

13. The multi-layer coating system of claim 1, wherein the second coating layer is prepared from a curable coating composition that is the same as or different from the curable coating composition used to form the first coating layer, and wherein the curable coating composition used to form the second coating layer comprises:
(a) a binder comprising:
 (i) a film-forming resin comprising at least two functional groups; and
 (ii) a curing agent reactive with the functional groups of (i); and
(b) solid vulcanized rubber particles unreactive with the binder,
wherein the curable coating composition used to form the second coating layer is a solid particulate powder coating composition.

14. A substrate at least partially coated with a curable coating composition, the curable coating composition comprising:
(a) a binder comprising:
 (i) a film-forming resin having a glass transition temperature (Tg) of at least 35° C. and comprising at least two functional groups; and
 (ii) a curing agent reactive with the functional groups of (i); and
(b) solid vulcanized rubber particles unreactive with any other component included in the curable coating composition, wherein the solid vulcanized rubber particles have a glass transition temperature ($T_g$) of less than −40° C.,
wherein the solid vulcanized rubber particles have an average particle size of from 10 to 85 microns,
wherein the curable coating composition is a solid particulate powder coating composition,
wherein the solid vulcanized rubber particles are not a component of a core-shell structure formed by reaction within the curable coating composition,
wherein the solid vulcanized rubber particles are crosslinked through sulfur bonds,
wherein the curable coating composition comprises from 1 weight % to 40 weight % of the solid vulcanized rubber particles, based on the total solids weight of the curable coating composition, and
wherein a coating layer formed from the curable coating composition has a dry film thickness of 300 to 800 microns.

15. The substrate of claim 14, wherein the curable coating composition further comprises an inorganic corrosion inhibiting component comprising a transition metal component, an alkali metal component, an alkaline earth metal component, or combinations thereof.

16. The substrate of claim 14, wherein the film-forming resin comprises an epoxy resin having at least two epoxide groups and wherein the curing agent is reactive with the epoxide groups.

17. The substrate of claim 16, wherein the epoxy resin further comprises at least one hydroxyl group.

18. The substrate of claim 17, wherein the curable coating composition further comprises a second curing agent that is reactive with the hydroxyl group.

19. The substrate of claim 14, wherein the film-forming resin comprises at least a first epoxy resin and a second epoxy resin that each independently comprise at least two epoxide groups and wherein the curing agent is reactive with the epoxide groups of the first epoxy resin and the second epoxy resin,
wherein the first epoxy resin has an equivalent weight that is greater than an equivalent weight of the second epoxy resin.

20. The substrate of claim 19, wherein the first and/or second epoxy resin further comprise at least one hydroxyl group.

* * * * *